(12) United States Patent
Sun

(10) Patent No.: US 8,472,169 B2
(45) Date of Patent: Jun. 25, 2013

(54) CABLE CLAMP, CIRCUIT BOARD AND COMPUTER ENCLOSURE USING THE CABLE CLAMP

(75) Inventor: Zheng-Heng Sun, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 306 days.

(21) Appl. No.: 12/949,786

(22) Filed: Nov. 19, 2010

(65) Prior Publication Data

US 2012/0106053 A1    May 3, 2012

(30) Foreign Application Priority Data

Oct. 28, 2010  (CN) .......................... 2010 1 0523166

(51) Int. Cl.
  *G06F 1/16*  (2006.01)
(52) U.S. Cl.
  USPC ................. 361/679.02; 345/905; 248/422
(58) Field of Classification Search
  USPC ............. 345/8, 173, 184, 1.1, 1.3, 168, 30, 345/501, 905, 619, 516, 163, 169, 170; 248/71, 248/551, 371, 125.1, 639, 68.1, 422, 118.5, 248/918; 439/459; 361/679.01, 679.27, 679.09, 361/679.23, 679.29, 679.41, 679.43, 679.45, 361/679.56, 679.07, 679.58, 679.12, 679.26; 455/414.1, 41.2, 456.1, 41.1, 566, 404.1, 455/567, 401, 466, 422.1, 426.1; 348/239, 348/345, 744, 333.1, 51, 36, 148, 175
  See application file for complete search history.

(56) References Cited

U.S. PATENT DOCUMENTS

| 7,527,226 | B2 * | 5/2009 | Kusuda et al. ................... 248/71 |
| 2004/0185705 | A1 * | 9/2004 | Wu ................. 439/459 |
| 2009/0243965 | A1 * | 10/2009 | Price et al. ........................ 345/8 |

FOREIGN PATENT DOCUMENTS

TW   M383867 U1   7/2010

* cited by examiner

*Primary Examiner* — Hung Duong
(74) *Attorney, Agent, or Firm* — Altis Law Group, Inc.

(57) ABSTRACT

A cable clamp mounted to a circuit board to bind cables, the cable clamp includes a clamp member to clamp the cables, and a fixable member extending from the clamp member to be fixed to the circuit board.

15 Claims, 3 Drawing Sheets

CABLE CLAMP, CIRCUIT BOARD AND COMPUTER ENCLOSURE USING THE CABLE CLAMP

BACKGROUND

1. Technical Field

The present disclosure relates to a cable clamp, a circuit board and a computer enclosure using the cable clamp.

2. Description of Related Art

Cable clamps can be used to bind cables in computers. However, the base of the cable clamps generally have a large size for being conveniently and tightly fixed to sidewalls of the computers, which will occupy large space in the computers and cannot be used in narrow spaces.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
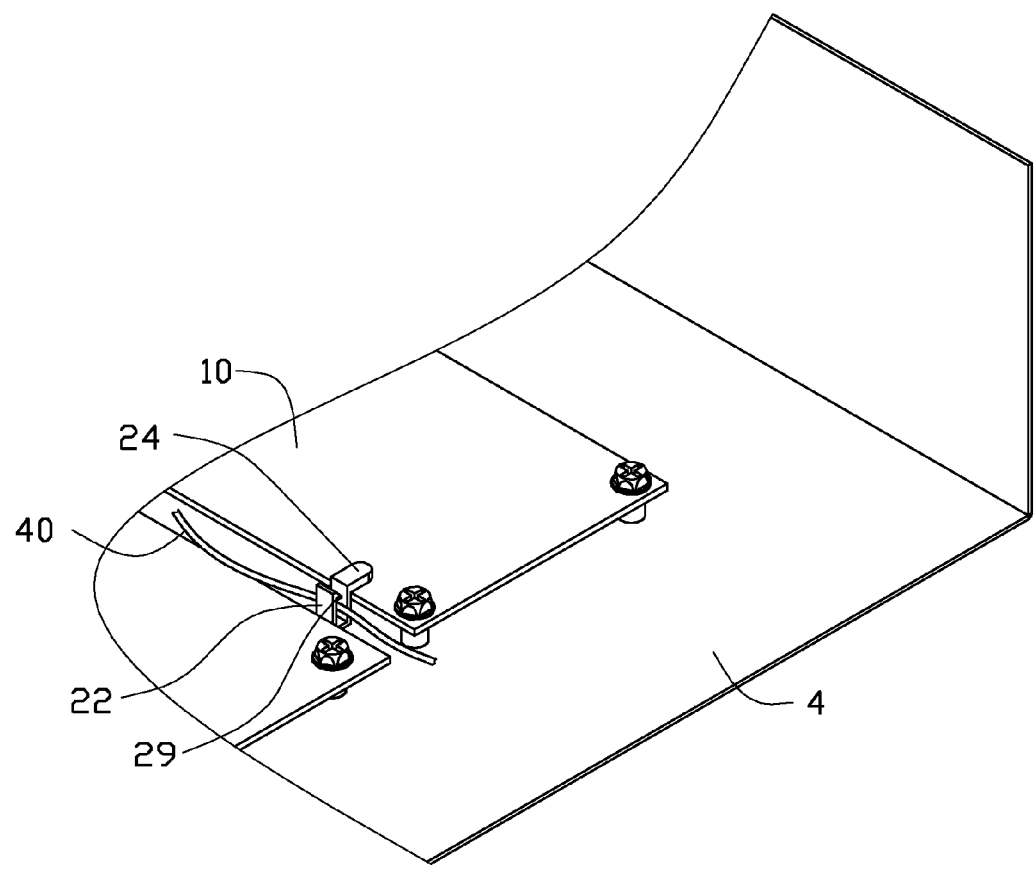
FIG. 1 is a partial, assembled, isometric view of an embodiment of a computer enclosure; the computer enclosure includes a cable clamp.
Figure 2:
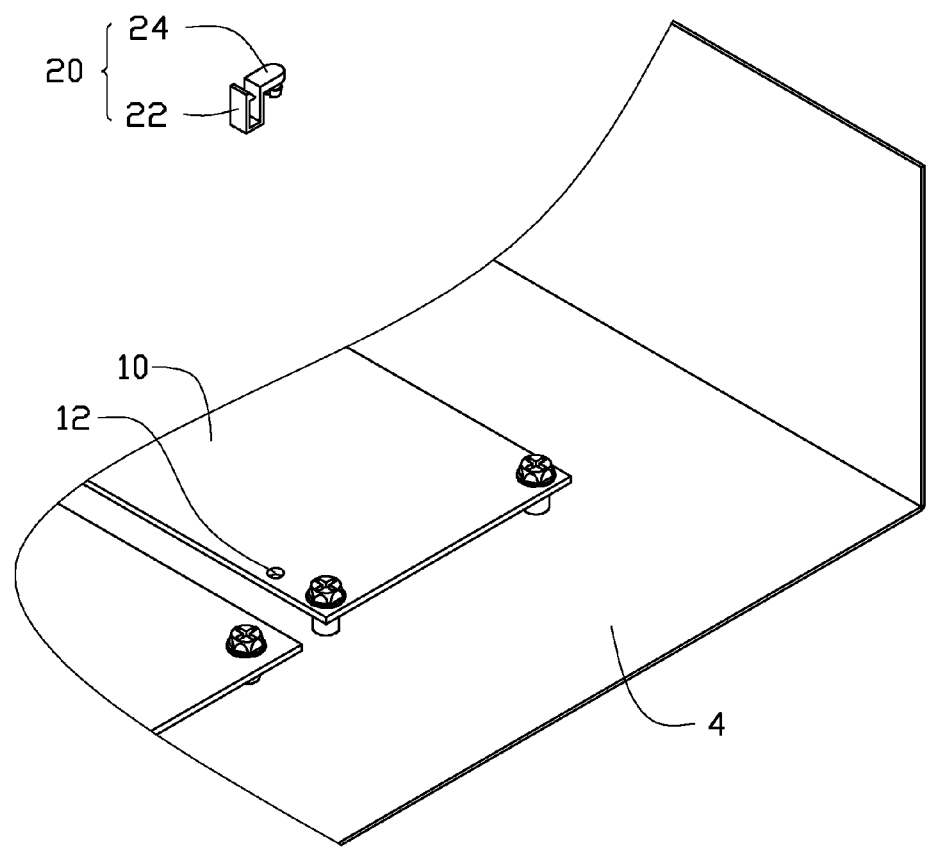
FIG. 2 is similar to FIG. 1, but showing the cable clamp exploded from the computer enclosure.

Referring to FIG. 1 and FIG. 2, an embodiment of a computer enclosure includes a sidewall 4, a circuit board 10 mounted on the sidewall 4, and a cable clamp 20.

The circuit board 10 defines a fixing hole 12 in a side of the circuit board 10.

Figure 3:
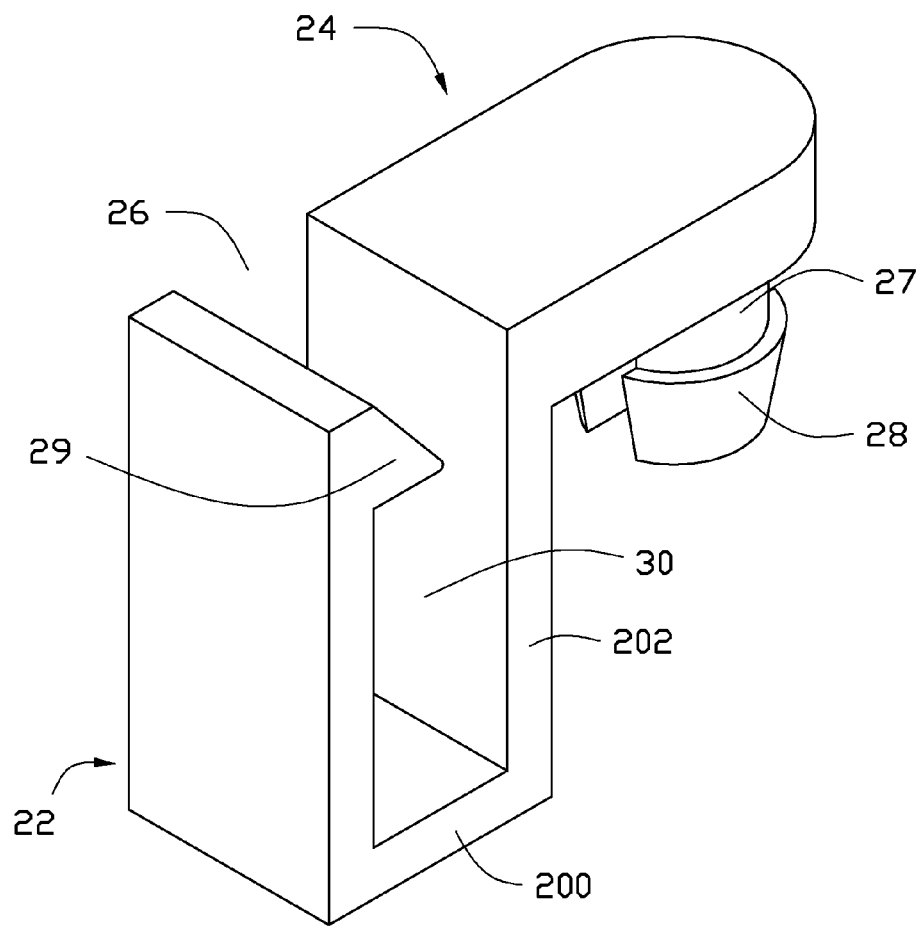
FIG. 3 is an enlarged view of the cable clamp of FIG. 2.

Referring to FIG. 3, the cable clamp 20 includes a substantially U-shaped elastic clamp member 22 and a fixable member 24 substantially perpendicularly extending from a first distal end of the clamp member 22. The clamp member 20 includes a bottom plate 200 and two side plates 202 perpendicularly extending up from opposite ends of the bottom plate 200. An opening 26 of the clamp member 22 defined by distal ends of the side plates 202 away from the bottom plate 200 faces upward, and the fixable member 24 perpendicularly extends out from the distal end of one of the side plates 202 in a direction perpendicular to the facing direction of the opening 26. A post 27 perpendicularly extends down from the bottom of the fixable member 24. A tapered engaging portion 28, which can be deformed, extends from a distal end of the post 27 opposite to the fixable member 24. A substantially wedge-shaped protrusion 29 extends from the distal end of the other side plate 202 of the clamp member 22 toward the opening 26. The clamp member 22 and the protrusion 29 bind the receiving space 30.

Referring to FIG. 1 again, in assembly, the engaging portion 28 of the post 27 is deformed to extend through the fixing hole 12 of the circuit board 10, with the post 27 accommodated in the fixing hole 12. Therefore, the cable clamp 20 is mounted to the circuit board 10 and is located beside the circuit board 10.

In use, the clamp member 22 is deformed to expand the opening 26, cables 40 may enter the receiving space 302 through the opening 26, and then are blocked by the protrusion 29.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A cable clamp for a computer enclosure having a circuit board, the cable clamp comprising:
a substantially U-shaped clamp member defining a receiving space to receive cables; the clamp member comprising a bottom plate and two side plates perpendicularly extending up from opposite ends of the bottom plate; distal ends of the side plates away from the bottom plate defining an opening facing upward; and
a fixable member perpendicularly extending out from one of the side plates of the clamp member in a direction perpendicular to the facing direction of the opening, to be fixed to the circuit board of the computer enclosure, to position the clamp member beside the circuit board.

2. The cable clamp of claim 1, wherein the fixable member extends from the distal end of the one of the side plates of clamp member.

3. The cable clamp of claim 2, wherein a wedge-shaped protrusion extends from the distal end of the other one of the side plates of the clamp member toward the fixable member.

4. The cable clamp of claim 1, wherein a post extends down from the fixable member to engage with the circuit board.

5. The cable clamp of claim 4, wherein a tapered engaging portion is formed on a distal end of the post.

6. A computer enclosure comprising:
a sidewall;
a circuit board mounted on the sidewall;
a plurality of cables; and
a cable clamp comprising a clamp member to clamp the plurality of cables, and a fixable member extending from the clamp member and fixed to the circuit board, the clamp member is rest on the sidewall in a side by side way with the circuit board.

7. The computer enclosure of claim 6, wherein the clamp member is substantially U-shaped, and comprises a bottom plate and two side plates perpendicularly extending up from opposite ends of the bottom plate; distal ends of the side plates away from the bottom plate define an opening facing upward, and wherein a receiving space is bounded by the clamp member to receive the plurality of cables.

8. The computer enclosure of claim 7, wherein the fixable member extends from the distal end of one of the side plates of the clamp member.

9. The computer enclosure of claim 8, wherein the circuit board defining a fixing hole, a post extends from the fixable member to engage in the fixing hole.

10. The computer enclosure of claim 9, wherein a tapered engaging portion is formed on a distal end of the post.

11. The computer enclosure of claim 8, wherein a substantially wedge-shaped protrusion extends from the distal end of the other side plate of the clamp member toward the fixable member.

12. A computer enclosure comprising:
a sidewall;
a circuit board mounted on the sidewall;
a plurality of cables; and
a substantially U-shaped cable clamp comprising a clamp member to clamp the plurality of cables, and a fixable member extending from the clamp member and fixed to the circuit board, the clamp member comprising a bottom plate and two side plates perpendicularly extending up from opposite ends of the bottom plate, the fixable member perpendicularly extending out from one of the side plates away from the other one, and the clamp member rests on the sidewall in a side by side way with the circuit board.

13. The computer enclosure of claim 12, wherein the circuit board defining a fixing hole, and a post extends down from a distal end of the fixable member to engage in the fixing hole.

14. The computer enclosure of claim 13, wherein a tapered engaging portion is formed on a distal end of the post.

15. The computer enclosure of claim 12, wherein a substantially wedge-shaped protrusion extends from a distal end of the other sidewall of the clamp member toward the fixable member.

* * * * *